United States Patent
Bischoff

(10) Patent No.: US 12,181,341 B2
(45) Date of Patent: Dec. 31, 2024

(54) METHOD AND SYSTEM FOR A ROBOUST COLOR MATCHING AND ADJUSTMENT PROCESS OF EFFECT COLORS

(71) Applicant: BASF Coatings GmbH, Münster (DE)

(72) Inventor: Guido Bischoff, Muenster (DE)

(73) Assignee: BASF COATINGS GMBH, Muenster (DE)

( * ) Notice: Subject to any disclaimer, the term of this patent is extended or adjusted under 35 U.S.C. 154(b) by 417 days.

(21) Appl. No.: 17/631,896

(22) PCT Filed: Aug. 1, 2020

(86) PCT No.: PCT/EP2020/071749
§ 371 (c)(1),
(2) Date: Feb. 1, 2022

(87) PCT Pub. No.: WO2021/023683
PCT Pub. Date: Feb. 11, 2021

(65) Prior Publication Data
US 2022/0283030 A1     Sep. 8, 2022

(30) Foreign Application Priority Data
Aug. 6, 2019   (EP) ..................... 19190393

(51) Int. Cl.
*G01J 3/46* (2006.01)
*G01J 3/50* (2006.01)

(52) U.S. Cl.
CPC ............ *G01J 3/463* (2013.01); *G01J 3/504* (2013.01)

(58) Field of Classification Search
CPC ............ G01J 3/463; G01J 3/504; G01J 3/462
(Continued)

(56) References Cited

U.S. PATENT DOCUMENTS

| 5,841,421 A | 11/1998 | Cheetham et al. |
| 2011/0250351 A1 * | 10/2011 | Steenhoek ............. G01N 21/25 427/140 |

FOREIGN PATENT DOCUMENTS

| WO | 2013081834 A1 | 6/2013 |
| WO | 2014134099 A1 | 9/2014 |

OTHER PUBLICATIONS

International Search Report and Written Opinion for corresponding PCT/EP2020/071749 mailed Nov. 26, 2020, 8 Pages.
(Continued)

*Primary Examiner* — Lee E Rodak
*Assistant Examiner* — Byung Ro Lee
(74) *Attorney, Agent, or Firm* — Armstrong Teasdale LLP

(57) ABSTRACT

Described herein is a computer-implemented method for providing a match metric for matching and adjusting color of a target coating and at least one sample coating, the method including at least the steps of: obtaining, via at least one communications interface, spectral curve(s) of the target coating and spectral curves of the sample coating determined at at least one gloss geometry; producing normalized first derivative values of the normalized spectral curves of the target coating and of the sample coating; producing difference values between the normalized first derivative values of the target coating and of the sample coating; producing a first match metric for the target coating and the sample coating based at least on the difference values produced for the at least one gloss geometry; and producing the match metric based on the first match metric. Also described herein is a respective system.

16 Claims, 3 Drawing Sheets

(58) Field of Classification Search
USPC .......................................................... 702/127
See application file for complete search history.

(56) References Cited

OTHER PUBLICATIONS

Fuan Tsai et al, "Derivative Analysis of Hyperspectral Data", Remote Sensing of Environment., vol. 66, No. 1, Oct. 1, 1998 (Oct. 1, 1998), p. 41-51.

* cited by examiner

METHOD AND SYSTEM FOR A ROBUST COLOR MATCHING AND ADJUSTMENT PROCESS OF EFFECT COLORS

CROSS-REFERENCE TO RELATED APPLICATIONS

This application is a U.S. National Phase Application of International Patent Application No. PCT/EP2020/071749, filed Aug. 1, 2020, which claims priority to European Patent Application No. 19190393.9, filed Aug. 6, 2019, the entire contents of which are hereby incorporated by reference herein.

FIELD OF THE INVENTION

The present disclosure refers to a method and a system for providing a match metric for color matching and adjusting at least one sample coating with/to a target coating.

BACKGROUND

Generally, effect colors include aluminum and/or interference pigment flakes. These types of pigment flakes act similar like small mirrors in paint and have a non-isotropic light reflection behavior. The light reflection is strongly depending on the distribution of orientations of the pigment flakes in the dry paint.

The orientation of the effect pigment flakes in the dry paint layer, in the following also called "coating" or "color coating", is strongly depending on the paint application and drying processes and is difficult to control. Small process variations in the paint application process, in particular in the manual spraying process, are often significant. That is why today often an automatic/robotic application process is used in order to reduce variances.

The described variations also have a strong impact on a color matching and adjustment process. Variations of effect pigment orientation lead to an uncertainty of light reflection of measured color coatings (which can change from application to application). In the color matching and adjustment process each color deviation (caused, inter alia, by a variation of flake orientation) initiates the matching algorithm to modify the paint formulation/formula in the way that the resulting color differences are compensated. The color adjustment is an iterative process. If the flake orientation together with the color is changing from adjustment step to step then the color adjustment process is converging slowly.

Therefore, it is an object of the present disclosure to provide a possibility to account for the variations of effect pigment orientation in a color matching and adjustment process.

SUMMARY OF THE INVENTION

The present disclosure provides a system and a method with the features of the independent claims. Embodiments are subject of the dependent claims and the description and drawings.

Today, a color matching and adjustment process is based on digital color measurements taken with a multi-angle spectrometer, e. g. a Byk-Mac® I or a spectrometer of the XRite MA®-T-family. Reflectance of a color coating is measured from several geometries (illumination and observation directions/angles). Typical measure geometries (in the following also called measurement geometries) are a fixed illumination angle at 45° measured relative to the surface normal of the coating and viewing angles of −15°, 15°, 25°, 45°, 75°, 110°, each measured relative to the specular angle, i. e. the specular direction, the specular direction being defined as the outgoing direction that makes the same angle with the normal of the color coating surface as the incoming direction of the respective light ray. One refers to a gloss geometry, when the viewing angle is chosen from the group comprising −15°, 15° and 25°, each measured relative to the specular angle; one refers to a flop geometry, when the viewing angle is chosen from the group comprising 45°, 75° and 110°, each measured relative to the specular angle. It is also possible to keep the viewing angle constant and to vary the illumination angle. In the scope of the present disclosure, the terms "measure geometry" and "measurement geometry" are used synonymously.

A known basic structure of the color matching and adjustment process:
1. Measure spectral curves of the target color, i. e. the target coating (spectral curves)
2. Measure spectral curves of the sample color, i. e. the sample coating (spectral curves)
3. Compute color values of target color and sample color, i. e. of target coating and sample coating, e. g. in CIELab* color space (Lab* or LCh* values)
4. Determine a metric for the color difference ("cost function") between target color and sample color, i. e. target coating and sample coating for all geometries, e. g. CIE dE*
5. Modify a formulation of the sample coating so that the color difference metric ("cost function") is minimized (typically done by a color matching algorithm).

The determined color difference between the target color and the sample color, i. e. between the target coating and the sample coating arises from at least three effects:
1. Non-optimal paint formulation
2. Variances/variations of effect pigment orientation
3. Systematic difference of effect pigment orientation The non-optimal paint formulation leads to a systematic color difference of the sample coating and is supposed to be corrected by the color matching algorithm via a modification of the respective formulation. The variances of the effect pigment orientation are a statistical error. As a variable error/bias they are disturbing the color matching algorithm and lead to a bad convergence of the adjustment process. The systematic difference of effect pigment orientation, which can be caused by e. g. a different paint application process (different spray gun, drying process, etc), leads to a systematic (and constant) color difference of the sample coating and is supposed to be compensated by the color adjustment algorithm.

It has been found that color differences which are caused by variances of flake orientation typically affect much stronger gloss geometries (e. g. measure geometries of −15°, 15°, 25°) than flop geometries (e. g. measure geometries of 45°, 75°, 110°) and they affect more the lightness and chroma metrics than a hue metric.

Today a solution for the problem is to evaluate the color difference metric of the gloss geometries only with a low weighting factor (or to ignore some of these geometries in total). But in many cases the gloss geometries include important characteristic information about the effect pigmentation and the hue.

As better solution, the present disclosure provides, according to claim 1, a computer-implemented method for providing a match metric for matching and adjusting color of a target coating and at least one sample coating, the method comprising at least the steps of:

a) obtaining, via at least one communications interface, colorimetric data of the target coating and colorimetric data of the sample coating, wherein the colorimetric data of the target coating comprise spectral curve(s) of the target coating measured at one or more measure geometries, and the colorimetric data of the sample coating comprise spectral curve(s) of the sample coating determined at the one or more measure geometries, wherein at least one of the one or more measure geometries is a gloss geometry; and by using one or more processors:

b) normalizing each of the spectral curves of the target coating measured at the respective one of the one or more measure geometries and the spectral curves of the sample coating determined at the respective one of the one or more measure geometries by using a non-linear scaling function;

c) producing, at least for the at least one gloss geometry of the one or more measure geometries and for a number of wavelength values, normalized first derivative values of the respective normalized spectral curve of the target coating measured at the respective one of the one or more measure geometries and normalized first derivative values of the respective normalized spectral curve of the sample coating determined at the respective one of the one or more measure geometries;

d) producing, at least for the at least one gloss geometry and for each wavelength value of the number of wavelength values, difference values between the normalized first derivative values of the normalized reflectance curve of the target coating and the normalized first derivative values of the normalized reflectance curve of the sample coating;

e) producing a first match metric for the target coating and the sample coating based at least on the difference values produced for the at least one gloss geometry;

f) producing the match metric based on the first match metric and outputting the produced match metric on an output device.

In the scope of the present disclosure, the terms "spectral curve", "spectral reflectance curve" and "reflectance curve" are used synonymously.

According to one aspect, the spectral curve(s) of the target coating and the spectral curve(s) of the sample coating are defined by reflectance values of the target coating and reflectance values of the sample coating, respectively, which have been measured or determined for a number of wavelength values. At least for the at least one gloss geometry of the one or more measure geometries, each of the reflectance values of the target coating measured at the respective one of the one or more measure geometries and the reflectance values of the sample coating determined at the respective one of the one or more measure geometries is normalized by using a scaling function, e. g. a non-linear scaling function. Furthermore, at least for the at least one gloss geometry of the one or more measure geometries, a normalized reflectance curve of the target coating from the normalized reflectance values of the target coating for each wavelength value of the number of wavelength values, and a normalized reflectance curve of the sample coating from the normalized reflectance values of the sample coating for each wavelength value of the number of wavelength values are generated.

For the number of wavelength values and at least for the at least one gloss geometry of the one or more measure geometries, normalized first derivative values of the normalized reflectance curve of the target coating with respect to the wavelength and normalized first derivative values of the normalized reflectance curve of the sample coating with respect to the wavelength are produced. Finally, at least for the at least one gloss geometry of the one or more measure geometries and for each wavelength value of the number of wavelength values difference values between the normalized first derivative values of the normalized reflectance curve of the target coating and the normalized first derivative values of the normalized reflectance curve of the sample coating are generated. The first match metric is produced based on the difference values for all of the number of wavelength values.

According to one possible embodiment of the proposed method, the normalized first derivative values of the target coating and the normalized first derivative values of the sample coating, respectively, are transformed with respect to the wavelength, into an angular representation.

According to one embodiment of the proposed method the normalized first derivative values of the target coating and the normalized first derivative values of the sample coating, respectively, are represented, for each wavelength value as a two-dimensional vector according to the following formulas:

$$u_{\lambda_i} = \begin{pmatrix} k_1 \cdot \Delta\lambda_i \\ \Delta R_{ref,\lambda_i}^{norm} \end{pmatrix}$$

$$v_{\lambda_i} = \begin{pmatrix} k_1 \cdot \Delta\lambda_i \\ \Delta R_{smp,\lambda_i}^{norm} \end{pmatrix}$$

$$\theta_{\lambda_i} = \cos^{-1}\left(\frac{u_{\lambda_i} \cdot v_{\lambda_i}}{|u_{\lambda_i}| \cdot |v_{\lambda_i}|}\right)$$

with $$\Delta R_{ref,\lambda_i}^{norm} = R_{ref,\lambda_i+\Delta\lambda_i}^{norm} - R_{ref,\lambda_i}^{norm}, \text{ and}$$

$$\Delta R_{smp,\lambda_i}^{norm} = R_{smp,\lambda_i+\Delta\lambda_i}^{norm} - R_{smp,\lambda_i}^{norm}, \text{ and}$$

$$\Delta\lambda_i = \lambda_{i+1} - \lambda_i,$$

wherein $R_{ref,\lambda_i}^{norm}$ indicates a normalized reflectance value of the target coating at the wavelength value $\lambda_i$, $R_{ref,\lambda_i\Delta\lambda_i}^{norm}$ indicates a normalized reflectance value of the target coating at the wavelength value $\lambda_{i+1}$, $R_{smp,\lambda_i}^{norm}$ indicates a normalized reflectance value of the sample coating at the wavelength value $\lambda_i$, $R_{smp,\lambda_{i+1}}^{norm}$ indicates a normalized reflectance value of the sample coating at the wavelength value $\lambda_{i+1}$, $k_1$ is a non-linear damping parameter with, for example, $k_1=0.005$, and $\theta_{\lambda_i}$ indicates the angle between the two normalized vectors $u_{\lambda_i}$ and $v_{\lambda_i}$, the vector $u_{\lambda_i}$ indicating a normalized gradient of the reflectance curve of the target coating at $\lambda_i$ and the vector $v_{\lambda_i}$ indicating a normalized gradient of the reflectance curve of the sample coating at $\lambda_i$. Thus, $\theta_{\lambda_i}$ indicates a kind of normalized difference value/ angle between both spectral curves at the wavelength value $\lambda_i$.

According to one aspect, the wavelength values of the number of wavelength values are chosen from an interval from a minimum wavelength value to a maximum wavelength value, with the minimum wavelength value being about 420 nm and the maximum wavelength value being about 680 nm, i.e.:

$$\lambda_i = \lambda_{min}, \ldots, \lambda_{max}$$

$$\lambda_{min} \approx 420 \text{ nm}$$

$$\lambda_{max} \approx 680 \text{ nm}$$

wherein the number of measured reflectance values between $\lambda_{min}$ and $\lambda_{max}$ is n and the index of the respective reflectance values i∈[0, ... (n−1)].

As the human eye operates particularly in the range from 400 nm to 700 nm, this range of wavelength values is highly relevant. The spectral range lower than 420 nm can be excluded from analysis because of measurement uncertainty caused by additives in coatings like e. g. UV-blockers. The spectral range higher than 680 nm can be excluded from analysis because of limitations of paint layers regarding hiding power and resulting interferences with the substrate color.

The proposed first match metric allows to identify differences between a target coating and a sample coating, even if the color associated with the target coating and the color associated with the sample coating lie on the same point or on adjacent points in the CIELab* space. Thus, a metamerism effect can be considered and identified.

The normalized spectral reflectance curve of the target coating is given/defined by the normalized reflectance values $R_{ref,\lambda_i}^{norm}$.

The normalized spectral reflectance curve of the sample coating is given/defined by the normalized reflectance values $R_{smp,\lambda_i}^{norm}$.

For the purpose of comparison, the reflectance values are normalized by a scaling function which is chosen as a non-linear scaling function $f_{ref,smp}$, particularly as follows:

$$f_{ref/smp} = \frac{1}{Norm_{R_{ref/smp}}}$$

with $$Norm_{R_{ref/smo}} = \frac{116 \cdot x_{ref/smp} - 16}{100}$$

with $$x_{ref/smp} = \begin{cases} \sqrt[3]{R_{ref/smp,center}}, & R_{ref/smp,center} > \frac{216}{24389} \\ \frac{\frac{24389}{27} R_{ref/smp,center} + 16}{116}, & \text{otherwise} \end{cases}$$

wherein $R_{ref/smp,center}$ is given by:

$$R_{ref/smp,center} = R_{ref/smp,min} + \frac{R_{ref/smp,max} - R_{ref/smp,min}}{2}$$

with $R_{ref/smp,center} = \text{Max}(R_{ref/smp,\lambda_i})$ and $R_{ref/smp,min} = \text{Min}(R_{ref/smp,\lambda_i})$ wherein $R_{ref/smp,\lambda_i}$ designates both, $R_{ref,\lambda_i}$ and $R_{smp,\lambda_i}$, wherein $R_{ref,\lambda_i}$ is the reflectance value of the target coating at the wavelength value $\lambda_i$ and $R_{smp,\lambda_i}$ is the reflectance value of the sample coating at the wavelength value $\lambda_i$.

The non-linear scaling function $f_{ref,smp}$ is referring to the luminance (L*) algorithm for the conversion of colors from the XYZ color space into the CIELab* color space. The L* metric is intended to mimic the logarithmic response for lightness of the human eye. The scaling function attempts to linearize the perceptibility of lightness.

According to one aspect of the proposed method, the first match metric is chosen as follows:

$$dShape = k_2 \cdot \frac{31}{n} \cdot \sum_{i=0}^{n-2} \theta_{\lambda_i}$$

wherein n is an integer and $k_2$ is a linear scaling factor with, for example, $k_2=0.65$.

According to a further aspect of the proposed method, the first match metric is chosen as follows:

$$dShape^* = k_2^* \cdot \frac{31}{n} \cdot \sum_{i=0}^{n-2} \frac{|\Delta R_{smp,\lambda_i}^{norm} - \Delta R_{ref,\lambda_i}^{norm}|}{k_1 \cdot \Delta \lambda_i}$$

wherein n is an integer and $k_2^*$ is a linear scaling factor with, for example, $k_2^*=100$.

The parameter $k_1$ and the parameters $k_2$, $k_2^*$ are freely selectable so as to define together (see formulas described above) the scale for the first match metric value dShape, dShape*.

Particularly advantageous, the first match metric is used for the case that both, the target coating and the sample coating comprise effect pigments. The first match metric can account for the variations of effect pigment orientation which can lead to an uncertainty of light reflection of measured color coatings. Color differences which are caused by variances of flake/effect pigment orientation typically affect much stronger the gloss geometries (−15°, 15°, 25°) than the flop geometries (45°, 75°, 110°) and they affect more the lightness and chroma metrics than the hue metric. The first match metric is determined to be insensitive for color differences which are caused by variances of flake/effect pigment orientation. The first match metric yields values in a scale, i.e. a scale space that is comparable to the scale space of the CIELab* color space and of color distance metrics which are defined in the CIELab* color space like e. g. the lightness difference metric dL* and the color difference metric dE*. Thus, most colorimetric data which are available and usable in a color matching, adjusting and searching process can be provided in comparable scales, so that an interpretation of the colorimetric data in an overall view is facilitated. Due to the scaling function the gained values of the first match metric can be interpreted regardless of the absolute color coordinates of the target coating, in particular regardless of its lightness L*.

In still a further embodiment of the proposed method, the method further comprises the steps of:

g) obtaining, via the at least one communications interface, further colorimetric data of the target coating and further colorimetric data of the sample coating, wherein the colorimetric data of the target coating comprise colorimetric coordinates of the target coating measured at one or more measure geometries, and the colorimetric data of the sample coating comprise colorimetric coordinates of the sample coating determined at the one or more measure geometries, wherein at least one of the one or more measure geometries is a flop geometry; and by using the one or more processors:

h) producing color difference values at least for the at least one flop geometry based on the colorimetric coordinates of the target coating and the colorimetric coordinates of the sample coating;

i) producing a second match metric for the target coating and the sample coating based at least on the color difference values produced for the at least one flop geometry;

j) amplifying, i.e. enhancing the match metric by the second match metric.

The match metric account now for both, the flop geometries and the gloss geometries. Thus, the initial formulation of the sample coating is modified so as to minimize both, the first match metric and the second match metric.

The one or more measure geometries for which colorimetric coordinates are obtained may comprise at least one of the one or more measure geometries for which the spectral curves are obtained. That means that the group of the one or more measure geometries mentioned in step g) may at least overlap with the group of the one or more measure geometries mentioned in step a). However, the group of the one or more measure geometries of step a) comprises at least one gloss geometry while the group of the one or more measure geometries of step g) comprises at least one flop geometry.

According to a further aspect of the present disclosure, the method further comprises the step of:
k) modifying, using the one or more processors, an initial formulation of the sample coating so as to minimize the match metric.

The initial formulation/formula of the sample coating can be pre-given or can be selected from a formulation database comprising formulas for coating compositions and interrelated colorimetric data. The colorimetric data, particularly the spectral curves of the pre-given initial formulation of the sample coating can be either measured or determined by a radiative transfer model, e. g. a physical model (like e. g. "Kubelka-Munk"-model) or a statistical model (like e. g. neural network), that has been trained by training data obtained for a reference application process.

"Modifying" comprises admixing one or more components to the initial formula and/or omitting one or more components from the initial formula and/or changing a respective concentration/amount of one or more components of the initial formula, thus, obtaining a modified formula.

According to a further embodiment of the proposed method, the gloss geometry of the at least one gloss geometry is chosen from the group comprising −15°, 15° and 25°, each measured relative to the specular angle.

According to still a further embodiment of the proposed method, the flop geometry of the at least one flop geometry is chosen from the group comprising 45°, 75° and 110°, each measured relative to the specular angle.

In one possible aspect of the present disclosure, the first match metric is produced based on the difference values between the normalized first derivative values of the normalized spectral curve of the target coating (only) for the at least one gloss geometry of the one or more measure geometries and the normalized first derivative values of the normalized spectral curve of the sample coating (only) for the at least one gloss geometry of the one or more measure geometries, respectively, thus forming a gloss match metric. Further, the second match metric is produced based (only) on the color difference values produced for the at least one flop geometry, thus forming a flop match metric.

Thus, it is proposed, according to one embodiment of the provided method, to evaluate the color difference metric (second match metric) only for the flop geometries (or with a small weighting factor also for the gloss geometries), thus forming the flop match metric, and to evaluate a separate metric (first match metric) for the gloss geometries, thus forming the gloss match metric. The gloss match metric is supposed to filter out variances of the effect pigment orientation and to keep as much as possible characteristic information about the pigment selection in the target coating.

The characteristic information about the pigmentation in paint, i.e. in the target coating and the sample coating, respectively, is included in a respective shape of the measured spectral curves, particularly of the measured reflectance curves. In the scope of the present disclosure, the terms "spectral curve" and "reflectance curve" are used synonymously. Pigments have typical absorption and scattering characteristics which produce characteristic fingerprints in the spectral curves. For the analysis, the absolute intensities of the reflectance values are less important than the shape of the reflectance/spectral curve, which can be encoded by the first derivate of the normalized spectral curve.

According to the present disclosure, a useful metric for the gloss geometries is the difference between the normalized first derivate of the normalized spectral curves of the target coating and the sample coating. This metric includes information about the shape of the spectral curves and it does not include information about the absolute intensity of the reflectance values.

In another possible aspect of the present disclosure it is also possible to compute the match metric based on a combination of the first and the second match metric for at least one of the one or more measure geometries (gloss geometries and flop geometries), e. g. by a weighted sum of the first and the second match metric for each measure geometry, thus forming a mixed metric.

The strategy to use the normalized first derivate values of respective normalized spectral curves as match metric, particularly for gloss geometries (e. g. −15°, 15°, 25°) in order to filter out interferences caused by variations of paint application but to preserve characteristic information about the pigmentation in paint, can also be combined with other metrics in the field of color searching, matching and adjustment, e. g. with color difference metric and, optionally, texture difference metric.

The present disclosure further refers to a system for providing a match metric for matching and adjusting color of a target coating and at least one sample coating, the system comprising:
A) a computing device;
B) a computer program product, the computer program product comprises computer executable codes stored on a computer readable storage medium functionally coupled to the computing device and causes the computing device to perform a computing process when in operation, the computing process comprises the steps of:
B1) obtaining colorimetric data of the target coating and colorimetric data of the sample coating, wherein the colorimetric data of the target coating comprise spectral curve(s) of the target coating measured at one or more measure geometries, and the colorimetric data of the sample coating comprise spectral curve(s) of the sample coating determined at the one or more measure geometries, wherein at least one of the one or more measure geometries is a gloss geometry;
B2) normalizing each of the spectral curves of the target coating measured at the respective one of the one or more measure geometries and the spectral curves of the sample coating determined at the respective one of the one or more measure geometries by using a non-linear scaling function;
B3) producing, at least for the at least one gloss geometry of the one or more measure geometries and for a number of wavelength values, normalized first derivative values of the respective normalized spectral curve of the target coating measured at the respective one of the one or more measure geometries and normalized first derivative values of the respective normalized spectral curve of the sample coating determined at the respective one of the one or more measure geometries;

B4) producing, at least for the at least one gloss geometry of the one or more measure geometries and for each wavelength value of the number of wavelength values, difference values between the normalized first derivative values of the respective normalized spectral curve of the target coating and the normalized first derivative values of the respective normalized spectral curve of the sample coating;

B5) producing a first match metric for the target coating and the sample coating based at least on the difference values produced for the at least one gloss geometry;

B6) producing the match metric based on the first match metric and outputting the produced match metric via one or more output units, i. e. output devices.

According to one embodiment of the proposed system, the system further comprises:

C) a color measuring device;

D) a formulation database comprising formulas for coating compositions and interrelated colorimetric data;

wherein the computing device is functionally coupled to the color measuring device and the formulation database. The computing device may further comprise an input device and a display device.

Generally, the color measuring device is a spectrometer, particularly a multi-angle spectrometer, such as a Byk-Mac® I or a spectrometer of the XRite-MA®-T-family.

In still a further aspect, the computing process further comprises the steps of:

B7) obtaining further colorimetric data of the target coating and colorimetric data of the sample coating, wherein the colorimetric data of the target coating comprise colorimetric coordinates of the target coating measured at one or more measure geometries, and the colorimetric data of the sample coating comprise colorimetric coordinates of the sample coating determined at the one or more measure geometries, wherein at least one of the one or more measure geometries is a flop geometry;

B8) producing color difference values at least for the at least one flop geometry based on the colorimetric coordinates of the target coating and the colorimetric coordinates of the sample coating;

B9) producing a second match metric for the target coating and the sample coating based at least on the color difference values produced for the at least one flop geometry;

B10) amplifying, i.e. enhancing the match metric by the second match metric.

According to another embodiment of the system, the computing process further comprises a matching process for matching the color of the target coating and the at least one sample coating, the matching process comprises at least the steps of:

B11) retrieving from the formulation database one or more preliminary matching formulas based on the colorimetric data of the target coating;

B12) selecting at least one formula of the one or more preliminary matching formulas so as to minimize the match metric.

According to still another embodiment of the claimed system, the computing process further comprises the step of B13) modifying a formula for the sample coating so as to minimize the match metric.

Generally, at least the color measuring device, the computing device and the formulation database are networked among each other via respective communicative connections. Each of the communicative connections between the different components of the system may be a direct connection or an indirect connection, respectively. Each communicative connection may be a wired or a wireless connection. Each suitable communication technology may be used. The formulation database, the color measuring device, the computing device, each may include one or more communications interfaces for communicating with each other. Such communication may be executed using a wired data transmission protocol, such as fiber distributed data interface (FDDI), digital subscriber line (DSL), Ethernet, asynchronous transfer mode (ATM), or any other wired transmission protocol. Alternatively, the communication may be wirelessly via wireless communication networks using any of a variety of protocols, such as General Packet Radio Service (GPRS), Universal Mobile Telecommunications System (UMTS), Code Division Multiple Access (CDMA), Long Term Evolution (LTE), wireless Universal Serial Bus (USB), and/or any other wireless protocol. The respective communication may be a combination of a wireless and a wired communication.

The computing device may include or may be in communication with one or more input units, such as a touch screen, an audio input, a movement input, a mouse, a keypad input and/or the like. Further, the computing device may include or may be in communication with one or more output units, such as an audio output, a video output, screen/display output, and/or the like. The computing device may comprise the one or more processors mentioned herein.

The present disclosure also refers to the computer program product and the computer readable storage medium which are included by the proposed system described before.

Embodiments of the invention may be used with or incorporated in a computer system that may be a standalone unit or include one or more remote terminals or devices in communication with a central computer, located, for example, in a cloud, via a network such as, for example, the Internet or an intranet. As such, the computing device described herein and related components may be a portion of a local computer system or a remote computer or an online system or a combination thereof. The formulation database and software described herein may be stored in computer internal memory or in a non-transitory computer readable storage medium.

Within the scope of the present disclosure the database may be part of a data storage unit or may represent the data storage unit itself. The terms "database" and "data storage unit" are used synonymously.

The present disclosure describes a system and a method/metric to filter out interferences caused by variations of the paint application process and to preserve characteristic information about the pigmentation in paint. It allows to better deal with variances in the paint application process and to better match colors where the paint application process has changed in comparison to the reference/target paint application process (of a paint line).

The proposed method and system allow a better converging of a color matching and adjustment process. It is possible to sufficiently match colors although the at least one sample coating has been applied using different paint application processes than the target coating. Further an effort needed in a respective laboratory can be reduced for color development and for customer service matching. The color matching process as a whole is more reliable and faster.

The invention is further defined in the following examples. It should be understood that these examples, by indicating preferred embodiments of the invention, are given by way of illustration only. From the above discussion and the examples, one skilled in the art can ascertain the essential characteristics of this invention and without departing from the spirit and scope thereof, can make various changes and modifications of the invention to adapt it to various uses and conditions.

DETAILED DESCRIPTION OF THE DRAWINGS

Metallic coatings are often used as exterior finishes in automotive industry or on other products such as electronics goods. Generally, a metallic finish includes metallic flakes, typically aluminium flakes, in a polymer binder. Typical characteristics that affect an optical appearance of such metallic coatings are the size, shape, surface roughness, concentration and spatial orientation of the metallic flakes, and other pigments/additives. The flake orientation and, to some extent, the flake surface roughness have an effect on the distribution of light scattered by the metallic coating. Flake orientation is strongly dependent upon the application processing, i.e. the processing conditions of the coating application.

Figure 1:
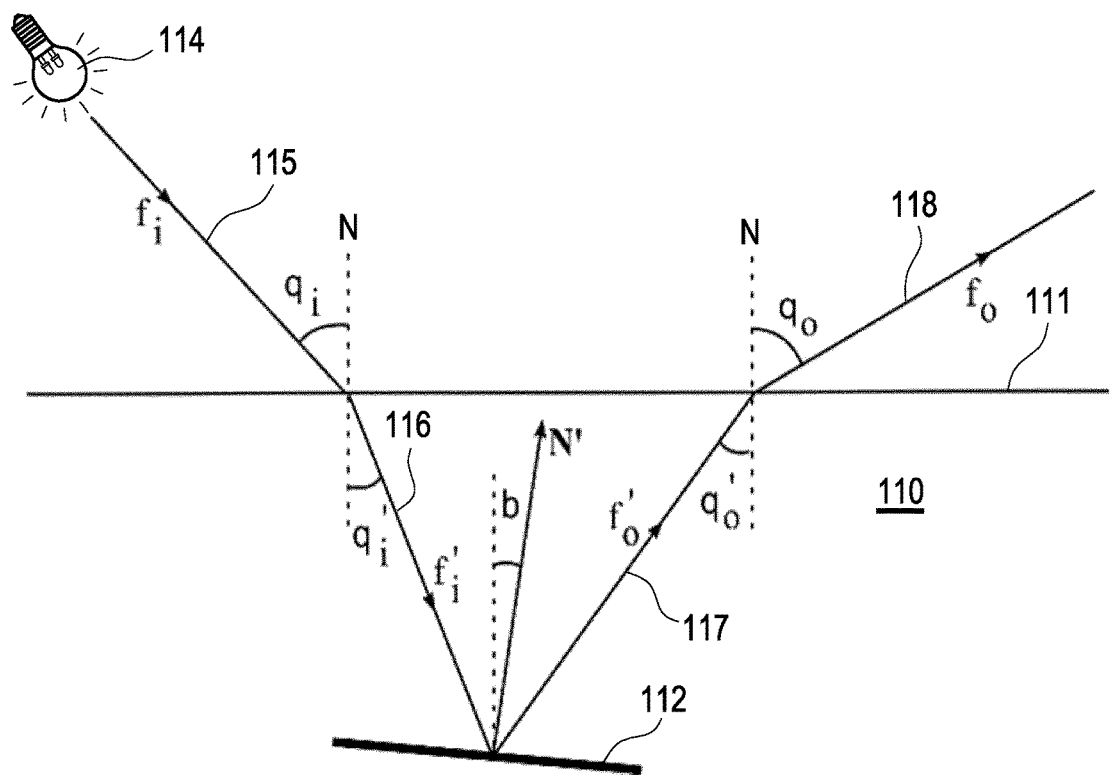
FIG. 1 shows schematically a possible statistically resulting orientation of one of a plurality of effect pigment flakes which are evenly distributed in a paint coating.

FIG. 1 shows a paint coating, i. e. a color coating 110 of an effect color with a surface 111. The color coating 110 comprises effect pigments which are evenly distributed as effect pigment flakes 112, such as aluminium and/or interference pigment flakes, within the coating 110. FIG. 1 shows a light ray trajectory of an oblique pigment flake 112.

When illuminating the paint coating 110 an incident light ray 115 from a light source 114 is directed at the surface 111 of the coating 110 in an illumination direction $f_i$ and hits the surface 111 at an illumination angle $q_i$. FIG. 1 presents the optical geometry, where $q_i$ and $q_o$ are the incidence and scattering angles measured with respect to the normal N of the surface 111 of the coating 110.

The incident light ray 115 is refracted at the coating surface 111 as light ray 116. The light ray 116 is oriented at an angle $q'_i$ measured with respect to the normal N of the coating surface 111. The light ray 116 hits the surface of the flake 112 in a direction $f'_i$ and is reflected by the surface of the flake 112 in a scattering direction $f'_o$ as light ray 117. The light ray 117 hits the coating surface 111 at an angle $q'_0$ and is refracted again at the surface coating 111 and leaves the coating 110 at the scattering angle $q_o$ in the scattering direction $f_o$ as light ray 118. The flake normal N' is oriented relative to the normal N of the coating surface 111 at an angle b.

Figure 2:
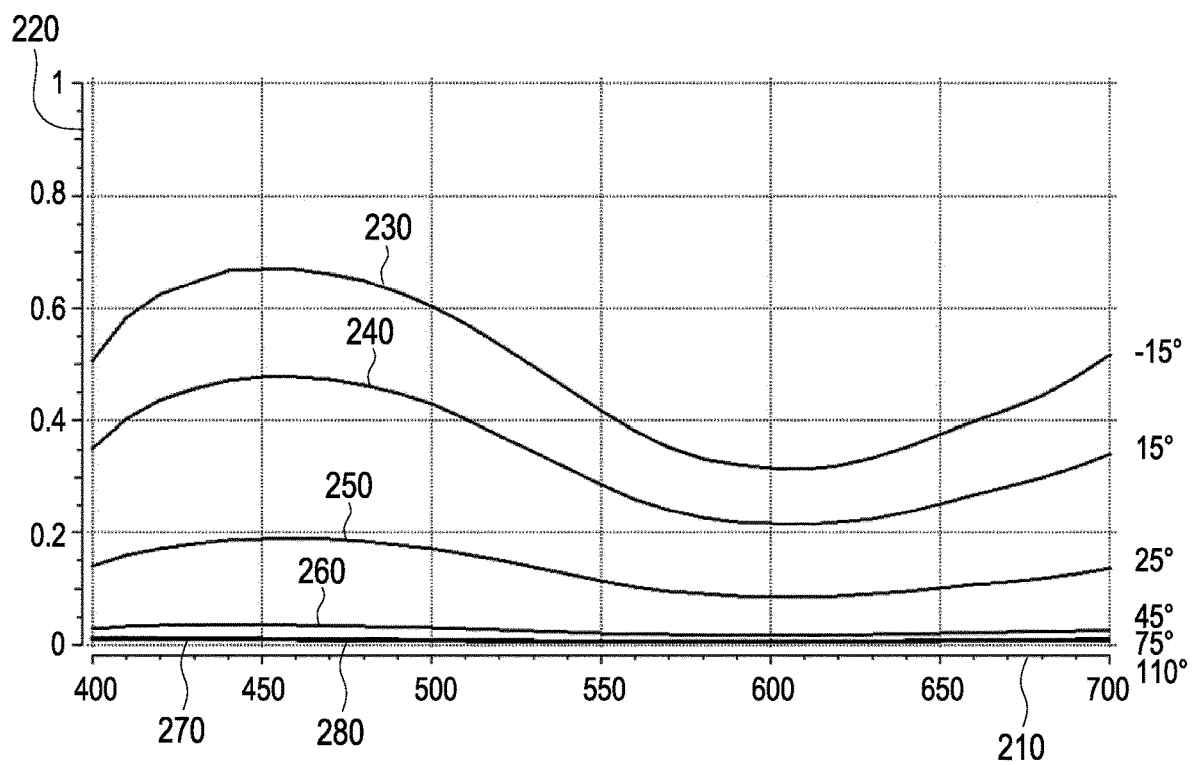
FIG. 2 shows a diagram about spectral measurements of a color coating at different measure geometries.

FIG. 2 shows spectral measurements of a color coating at different measure geometries. The in-plane bidirectional reflectance of a metallic pigmented sample coating was measured using a multi-angle spectrometer, e. g. a Byk-Mac® I or a spectrometer of the XRite MA®-T-family. Reflectance of the sample coating is measured from several geometries, namely with viewing angles of −15°, 15°, 25°, 45°, 75°, 110°, each measured relative to the specular angle.

FIG. 2 shows a diagram of the spectral measurements. The wavelength of an incident light flux is plotted (in nm) along a horizontal axis 210. The reflectance of the sample coating is plotted along a vertical axis 220. The curve 230 indicates the reflectance of the sample coating measured at a viewing angle of −15°, the curve 240 indicates the reflectance of the sample coating measured at a viewing angle of 15°, the curve 250 indicates the reflectance of the sample coating measured at a viewing angle of 25°, the curve 260 indicates the reflectance of the sample coating measured at a viewing angle of 45°, the curve 270 indicates the reflectance of the sample coating measured at a viewing angle of 75°, the curve 280 indicates the reflectance of the sample coating measured at a viewing angle of 110°. At the flop angles 45°, 75° and 110°, only small reflectance values are measured. Further, only small variances of shape of the respective curves dependent on the wavelength are observed.

Figure 3:
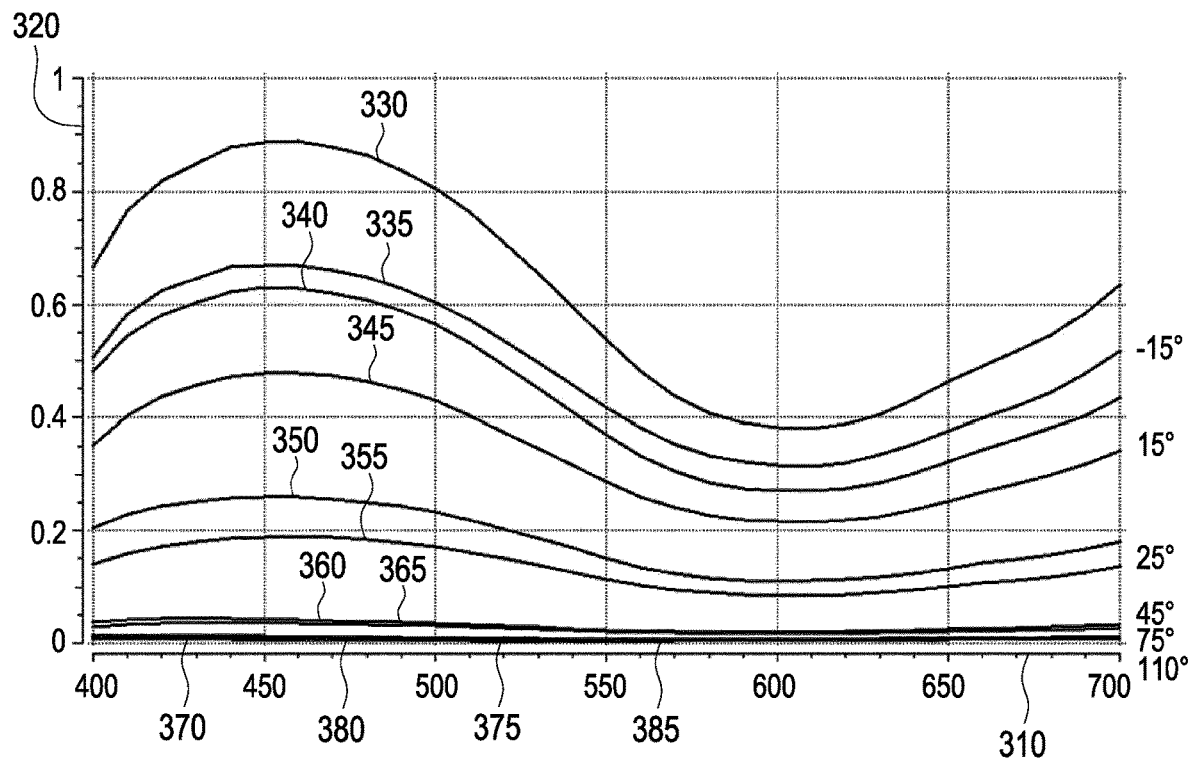
FIGS. 3a and 3b show respective diagrams about spectral measurements of a first sample color coating and a second sample color coating at different measure geometries.
Figure 3:
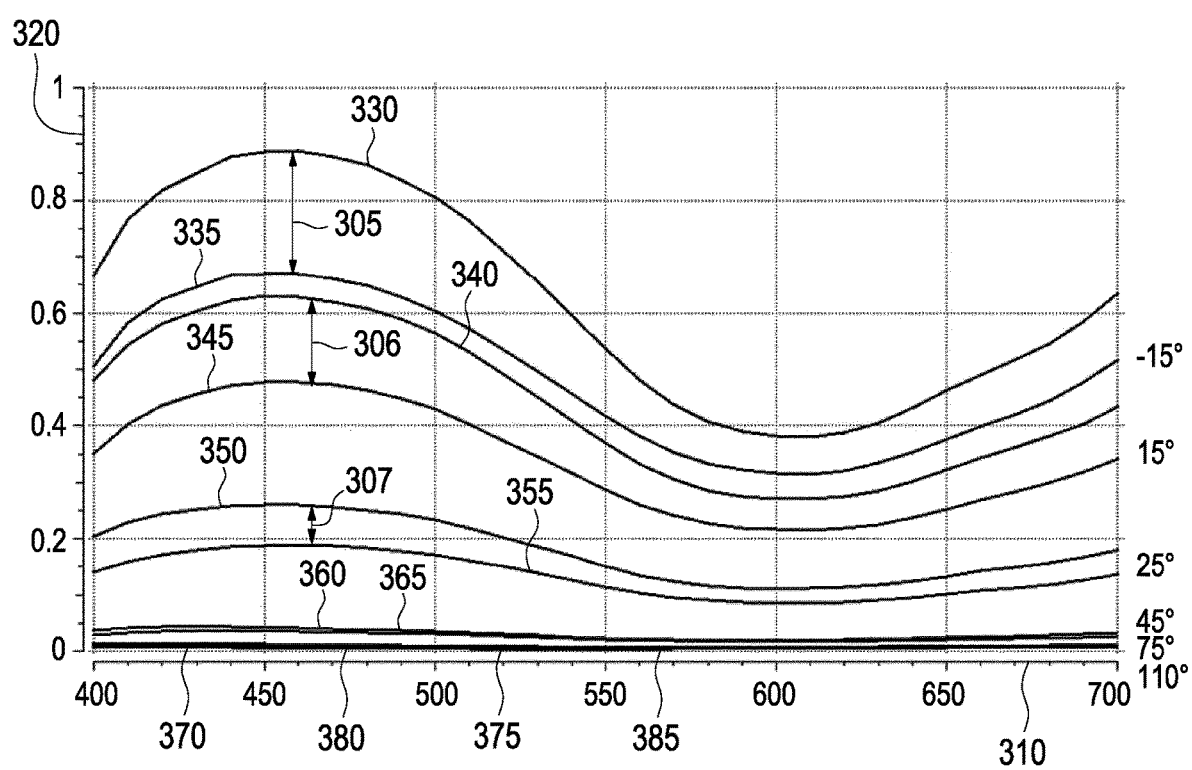

FIG. 3a shows a diagram of spectral measurements of two sample coatings with the same color, but with variances in application. The wavelength of the incident light flux is plotted (in nm) along a horizontal axis 310. The reflectance of the first sample coating and the second sample coating, respectively, is plotted along a vertical axis 320. The curve 330 indicates the reflectance of the first sample coating measured at a viewing angle of −15°, the curve 340 indicates the reflectance of the first sample coating measured at a viewing angle of 15°, the curve 350 indicates the reflectance of the first sample coating measured at a viewing angle of 25°, the curve 360 indicates the reflectance of the first sample coating measured at a viewing angle of 45°, the curve 370 indicates the reflectance of the first sample coating measured at a viewing angle of 75°, the curve 380 indicates the reflectance of the first sample coating measured at a viewing angle of 110°. The curve 335 indicates the reflectance of the second sample coating measured at a viewing angle of −15°, the curve 345 indicates the reflectance of the second sample coating measured at a viewing angle of 15°, the curve 355 indicates the reflectance of the second sample coating measured at a viewing angle of 25°, the curve 365 indicates the reflectance of the second sample coating measured at a viewing angle of 45°, the curve 375 indicates the reflectance of the second sample coating measured at a viewing angle of 75°, the curve 385 indicates the reflectance of the second sample coating measured at a viewing angle of 110°. It can be recognized that the effect pigments of the first sample coating have a better orientation than the effect pigments of the second sample, i.e. the effect pigments of the first sample coating tend more to be oriented parallel to the coating surface than the effect pigments of the second sample. Thus, the first sample coating shows higher reflectance values, particularly at the gloss angles −15°, 15° and 25° than the second sample coating. At the flop angles 45°, 75°, 110°, both, the first sample coating and the second sample coating show only small reflectance values and small variances in shape of the respective reflectance curves.

FIG. 3b shows a diagram of the same spectral measurements as FIG. 3a. As shown in FIG. 3b by respective double arrows 305, 306, 307, at the gloss geometries, namely −15°, 15° and 25°, a respective offset between the spectral measurements of the first sample coating and second sample coating is clearly visible. The characteristic information of the pigmentation can be extracted from the shape of the respective spectral curves by analyzing the respective normalized first derivative values of the spectral curves, thus ignoring the absolute intensities of the reflectance values which are less important than the shape of the respective reflectance curves.

Depending on the orientation of the effect pigment flakes which are distributed within the sample coating, the incident light ray is only reflected at a specific viewing angle (measured relative to the specular angle of the coating surface) by a respective pigment flake if the respective flake is oriented in specular direction relative to the incident light ray, i.e. the normal of the flake is the axis of reflection between the incident light ray and the specific viewing angle.

Figure 4:
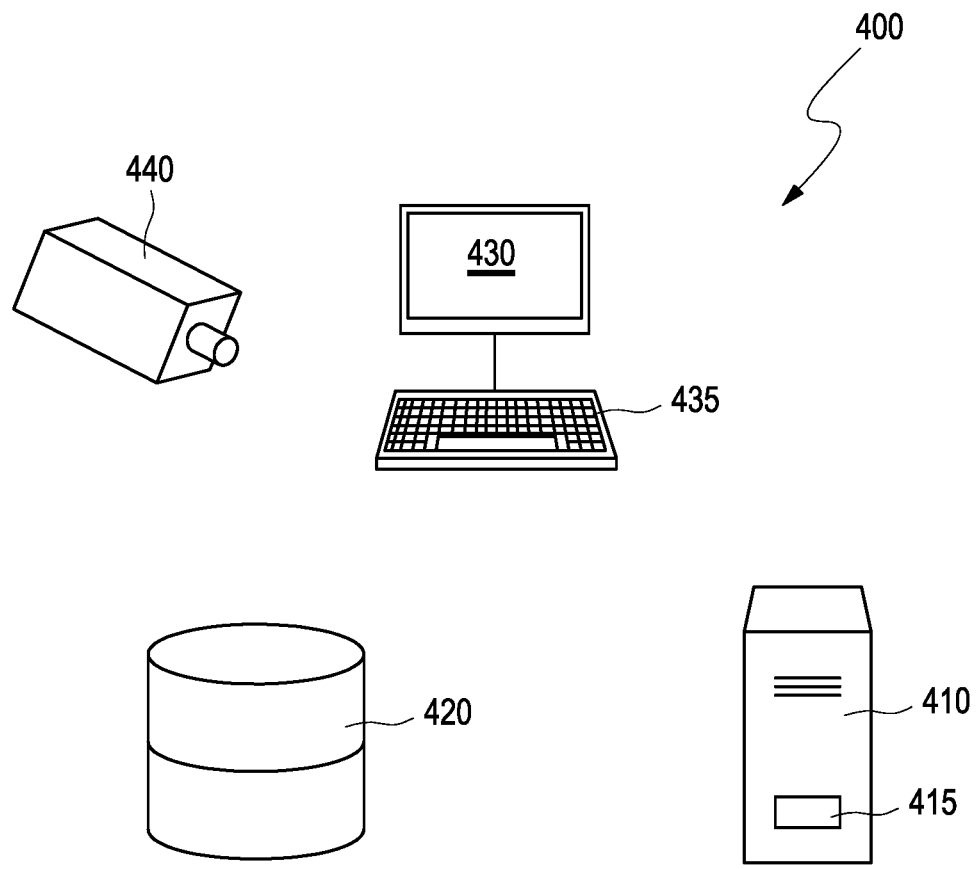
FIG. 4 shows a schematic diagram of an embodiment of the proposed system.

FIG. 4 schematically illustrates an embodiment of the proposed system. The system 400 is configured for providing a match metric for matching and adjusting color of at least one sample coating to a target coating. The system comprises a computing device 410. The system further comprises a computer program product which comprises computer executable codes stored on a computer readable storage medium 415. In the example shown here, the computer readable storage medium 415 is loaded in an internal memory of the computing device 410. Thus, the computer readable storage medium 415 is functionally coupled to the computing device 410. Any other functional coupling of the computer readable storage medium 415 and the computing device 410 is possible. The computer readable storage medium 415 causes the computing device 410 to perform a computing process when in operation, the computing process comprises the steps of:

- B1) obtaining, via at least one communications interface, colorimetric data of the target coating and colorimetric data of the sample coating, wherein the colorimetric data of the target coating comprise spectral curve(s) of the target coating measured at one or more measure geometries, and the colorimetric data of the sample coating comprise spectral curve(s) of the sample coating determined at the one or more measure geometries, wherein at least one of the one or more measure geometries is a gloss geometry;
- B2) normalizing each of the spectral curves of the target coating measured at the respective one of the one or more measurement geometries and the spectral curves of the sample coating determined at the respective one of the one or more measurement geometries by using a scaling function;
- B3) producing, at least for the at least one gloss geometry of the one or more measure geometries and for a number of wavelength values, normalized first derivative values of the respective normalized spectral curve of the target coating measured at the respective one of the one or more measure geometries and normalized first derivative values of the respective normalized spectral curve of the sample coating determined at the respective one of the one or more measure geometries;
- B4) producing, at least for the at least one gloss geometry of the one or more measure geometries and for each wavelength value of the number of wavelength values, difference values between the normalized first derivative values of the respective normalized spectral curve of the target coating and the normalized first derivative values of the respective normalized spectral curve of the sample coating;
- B5) producing a first match metric for the target coating and the sample coating based at least on the difference values produced for the at least one gloss geometry;
- B6) producing the match metric based on the first match metric and outputting the produced match metric for a user on/via an output device, such as a display device 430.

In the example shown here, the system further comprises a color measuring device 440 and a formulation database 420 comprising formulas for coating compositions and interrelated colorimetric data.

The computing device 410 is functionally coupled to the color measuring device 440 and the formulation database 420. The computing device 410 further comprises an input device 435 and the display device 430.

The computing process may further comprise the steps of:
- B7) obtaining, via the at least one communications interface, further colorimetric data of the target coating and colorimetric data of the sample coating, wherein the colorimetric data of the target coating comprise colorimetric coordinates of the target coating measured at one or more measure geometries, and the colorimetric data of the sample coating comprise colorimetric coordinates of the sample coating determined at the one or more measure geometries, wherein at least one of the one or more measure geometries is a flop geometry;
- B8) producing color difference values at least for the at least one flop geometry based on the colorimetric coordinates of the target coating and the colorimetric coordinates of the sample coating;
- B9) producing a second match metric for the target coating and the sample coating based at least on the color difference values produced for the at least one flop geometry;
- B10) amplifying the match metric by the second match metric.

The computing process further comprises a matching process for matching the color of at least one sample coating to a target coating, the matching process comprises at least the steps of:
- B11) retrieving from the formulation database one or more preliminary matching formulas based on the colorimetric data of the sample coating;
- B12) selecting at least one from the one or more preliminary matching formulas so as to minimize the match metric.

Finally, the formula for the sample coating may be modified so as to minimize the match metric.

LIST OF REFERENCE SIGNS 110 color coating
111 surface of the color coating
112 effect pigment flake
114 light source
115 incident light ray
116 light ray
117 light ray
118 light ray
210 horizontal axis
220 vertical axis
230 reflectance curve at −15°
240 reflectance curve at 15°
250 reflectance curve at 25°

260 reflectance curve at 45°
270 reflectance curve at 75°
280 reflectance curve at 110°
305, 306, 307 double arrows
310 horizontal axis
320 vertical axis
330 reflectance curve at −15°
335 reflectance curve at −15°
340 reflectance curve at 15°
345 reflectance curve at 15°
350 reflectance curve at 25°
355 reflectance curve at 25°
360 reflectance curve at 45°
365 reflectance curve at 45°
370 reflectance curve at 75°
375 reflectance curve at 75°
380 reflectance curve at 110°
385 reflectance curve at 110°
410 computing device
415 computer readable storage medium
420 formulation database
430 output device
435 input device
440 color measuring device

The invention claimed is:

1. A computer-implemented method for providing a match metric for matching and adjusting color of a target coating and at least one sample coating, the method implemented by a computer system including a color measuring device, a formulation database, at least one communications interface, an output device, and one or more processors, the method comprising at least the steps of:
   a) obtaining, via the at least one communications interface using the color measuring device, colorimetric data of the target coating and colorimetric data of the sample coating, wherein the colorimetric data of the target coating comprise spectral curve(s) of the target coating measured at one or more measure geometries, and the colorimetric data of the sample coating comprise spectral curve(s) of the sample coating determined at the one or more measure geometries, wherein at least one of the one or more measure geometries is a gloss geometry; and
   by using the one or more processors:
   b) normalizing each of the spectral curves of the target coating measured at a respective one of the one or more measure geometries and the spectral curves of the sample coating determined at the respective one of the one or more measure geometries by using a scaling function stored in the formulation database;
   c) producing, at least for the at least one gloss geometry of the one or more measure geometries and for a number of wavelength values, normalized first derivative values of the respective normalized spectral curve of the target coating measured at the respective one of the one or more measure geometries and normalized first derivative values of the respective normalized spectral curve of the sample coating determined at the respective one of the one or more measure geometries;
   d) producing, at least for the at least one gloss geometry and for each wavelength value of the number of wavelength values, difference values between the normalized first derivative values of the normalized reflectance curve of the target coating and the normalized first derivative values of the normalized reflectance curve of the sample coating;
   e) producing a first match metric for the target coating and the sample coating based at least on the difference values produced for the at least one gloss geometry, wherein the first match metric accounts for variations of effect pigment orientation in the target coating and the sample coating; and
   f) producing the match metric based on the first match metric and outputting, via the output device, the produced match metric for a user via the output device.

2. The method according to claim 1, further comprising the steps of:
   g) obtaining, via the at least one communications interface, further colorimetric data of the target coating and colorimetric data of the sample coating, wherein the colorimetric data of the target coating comprise colorimetric coordinates of the target coating measured at one or more measure geometries, and the colorimetric data of the sample coating comprise colorimetric coordinates of the sample coating determined at the one or more measure geometries, wherein at least one of the one or more measure geometries is a flop geometry;
   and by using the one or more processors
   h) producing color difference values at least for the at least one flop geometry based on the colorimetric coordinates of the target coating and the colorimetric coordinates of the sample coating;
   i) producing a second match metric for the target coating and the sample coating based at least on the color difference values produced for the at least one flop geometry, wherein the second match metric is a color difference metric; and
   j) amplifying the match metric by the second match metric, wherein the amplified match metric accounts for the at least one flop geometry and the at least one gloss geometry.

3. The method according to claim 2, wherein the formulation of the sample coating is modified so as to minimize both, the first match metric and the second match metric.

4. The method according to claim 2, wherein the at least one flop geometry is at least one measure of geometries selected from a group consisting of 45°, 75°, and 110°.

5. The method according to claim 2, wherein the second match metric is produced based on the color difference values produced for the at least one flop geometry, thus forming a flop match metric.

6. The method according to claim 2, wherein the match metric is produced based on a combination of the first match metric and the second match metric for the at least one measure geometry.

7. The method according to claim 2, wherein the match metric is produced based on a weighted sum of the first match metric and the second match metric for each measure geometry.

8. The method according to claim 1, further comprising the step of:
   k) modifying, using the one or more processors, a formulation of the sample coating so as to minimize the match metric.

9. The method according to claim 1, wherein both, the target coating and the sample coating comprise effect pigments.

10. The method according to claim 1, wherein the at least one gloss geometry is at least one measure of geometries selected from a group consisting of −15°, 15°, and 25°.

11. The method according to claim 1, wherein the first match metric is produced based on the difference values between the normalized first derivative values of the normalized spectral curve of the target coating for the at least one gloss geometry of the one or more measure geometries and the normalized first derivative values of the normalized spectral curve of the sample coating for the at least one gloss geometry of the one or more measure geometries, thus forming a gloss match metric.

12. A system for providing a match metric for matching and adjusting color of at least one sample coating to a target coating, the system comprising:
- a computing device comprising one or more processors;
- a color measuring device;
- a formulation database comprising formulas for coating compositions and interrelated colorimetric data;
- at least one communications interface;
- an output device; and
- a computer program product, the computer program product comprises computer executable codes stored on a computer readable storage medium functionally coupled to the computing device and causes the one or more processors to perform a computing process when in operation, the computing process comprises the steps of:
  - obtaining, via the at least one communications interface using the color measuring device, colorimetric data of the target coating and colorimetric data of the sample coating, wherein the colorimetric data of the target coating comprise spectral curve(s) of the target coating measured at one or more measure geometries, and the colorimetric data of the sample coating comprise spectral curve(s) of the sample coating determined at the one or more measure geometries, wherein at least one of the one or more measure geometries is a gloss geometry;
  - normalizing each of the spectral curves of the target coating measured at the respective one of the one or more measure geometries and the spectral curves of the sample coating determined at the respective one of the one or more measure geometries by using a scaling function stored in the formulation database;
  - producing, at least for the at least one gloss geometry of the one or more measure geometries and for a number of wavelength values, normalized first derivative values of the respective normalized spectral curve of the target coating measured at the respective one of the one or more measure geometries and normalized first derivative values of the respective normalized spectral curve of the sample coating determined at the respective one of the one or more measure geometries;
  - producing, at least for the at least one gloss geometry of the one or more measure geometries and for each wavelength value of the number of wavelength values, difference values between the normalized first derivative values of the respective normalized spectral curve of the target coating and the normalized first derivative values of the respective normalized spectral curve of the sample coating;
  - producing a first match metric for the target coating and the sample coating based at least on the difference values produced for the at least one gloss geometry, wherein the first match metric accounts for variations of effect pigment orientation in the target coating and the sample coating; and
  - producing the match metric based on the first match metric and outputting, via the output device, the produced match metric for a user via the output device.

13. The system according to claim 12, wherein the formulation database comprises formulas for coating compositions and interrelated colorimetric data and wherein the computing device is functionally coupled to the color measuring device and the formulation database.

14. The system according to claim 12, the computing process further comprising the steps of:
- B7) obtaining further colorimetric data of the target coating and colorimetric data of the sample coating, wherein the colorimetric data of the target coating comprise colorimetric coordinates of the target coating measured at one or more measure geometries, and the colorimetric data of the sample coating comprise colorimetric coordinates of the sample coating determined at the one or more measure geometries, wherein at least one of the one or more measure geometries is a flop geometry;
- B8) producing color difference values at least for the at least one flop geometry based on the colorimetric coordinates of the target coating and the colorimetric coordinates of the sample coating;
- B9) producing a second match metric for the target coating and the sample coating based at least on the color difference values produced for the at least one flop geometry, wherein the second match metric is a color difference metric; and
- B10) amplifying the match metric by the second match metric, wherein the amplified match metric accounts for the at least one flop geometry and the at least one gloss geometry.

15. The system according to claim 12, wherein the computing process further comprises a matching process for matching the color of at least one sample coating to a target coating, the matching process comprises at least the steps of:
- B11) retrieving from the formulation database one or more preliminary matching formulas based on the colorimetric data of the target coating; and
- B12) selecting at least one from the one or more preliminary matching formulas so as to minimize the match metric.

16. The system according to claim 12, wherein the computing process further comprises the step of:
- B13) modifying a formula for the sample coating so as to minimize the match metric.

* * * * *